W. BEHM.
REVERSIBLE HANDLE.
APPLICATION FILED JUNE 10, 1910.
986,796.
Patented Mar. 14, 1911.
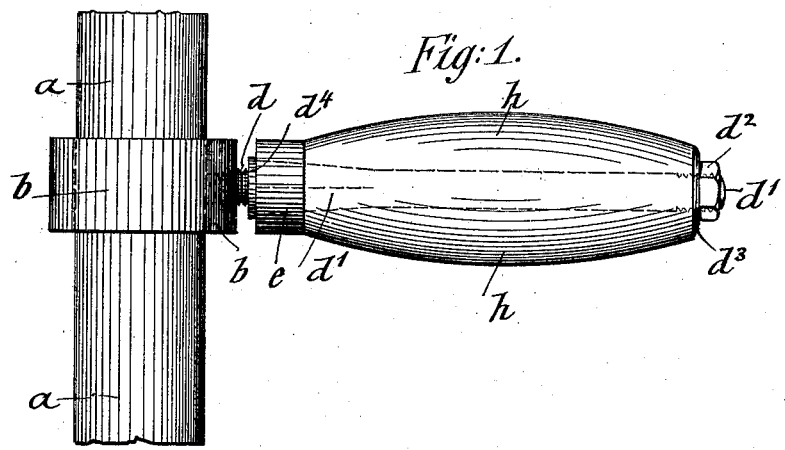
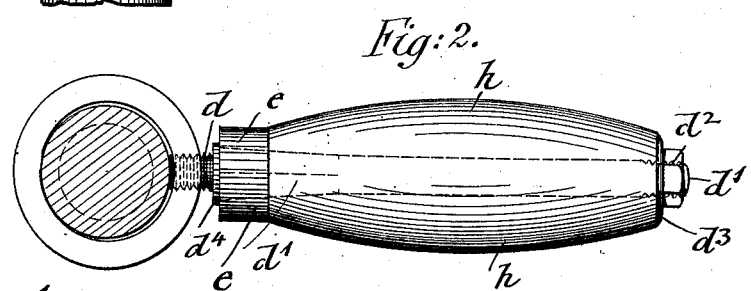
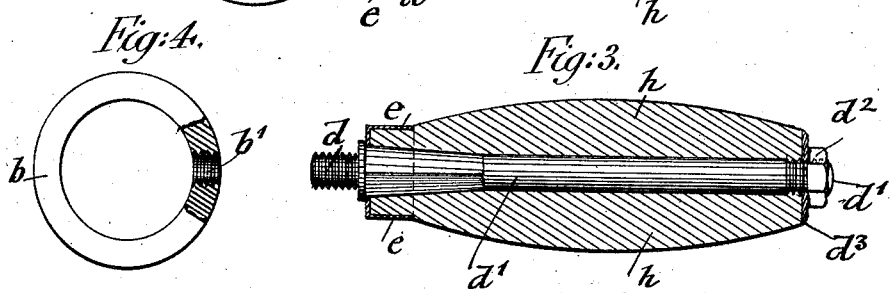
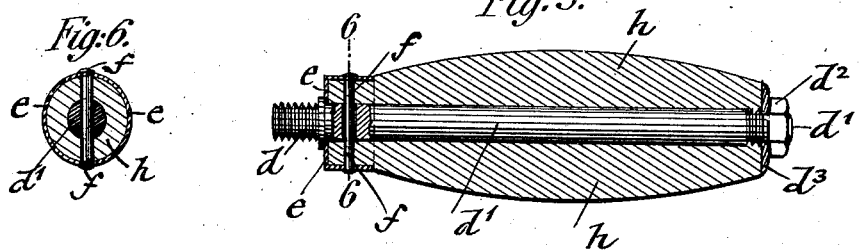

UNITED STATES PATENT OFFICE.

WALTHER BEHM, OF NEW YORK, N. Y., ASSIGNOR TO ARTHUR SCHULER, OF NEW YORK, N. Y.

REVERSIBLE HANDLE.

986,796. Specification of Letters Patent. Patented Mar. 14, 1911.

Application filed June 10, 1910. Serial No. 566,186.

*To all whom it may concern:*

Be it known that I, WALTHER BEHM, a citizen of the German Empire, residing in New York, in the borough of Manhattan, county and State of New York, have invented certain new and useful Improvements in Reversible Handles, of which the following is a specification.

This invention relates to an improved reversible handle to be used with hand-operated vacuum-cleaners, floor-mops and other implements so as to permit the use of the same by either the right or left hand, by the simple adjustment of the handle either to one side or the other of the implement; and for this purpose the invention consists of a reversible handle comprising a collar provided with an interiorly-threaded opening, a set-screw screwing into said opening and provided with a stem, a handle on said stem, and means for attaching the handle thereto.

In the accompanying drawings, Figure 1 represents a side-elevation of my improved reversible handle, Fig. 2 is a top-view of the same, Fig. 3 is a vertical longitudinal section through the handle, Fig. 4 is a detail top-view, partly in section, of the collar to which the handle is applied, and Figs. 5 and 6 are respectively a vertical longitudinal section and a vertical transverse section on line 6, 6, Fig. 5, of a modified construction of the handle.

Similar letters of reference indicate corresponding parts throughout the different figures.

Referring to the drawings, $a$ represents the neck of a hand vacuum-cleaner, the stick of a floor-mop or any other suitable implement, and $b$ a collar placed around the neck or stick of the implement, said collar being provided with an interiorly-threaded opening $b^1$, as shown in Fig. 4. Into the threaded opening $b^1$ of the collar $b$ is screwed a clamping screw $d$ which is provided with a stem $d^1$ to the threaded outer end of which the reversible handle $h$ is attached by a screw-nut $d^2$, a washer $d^3$ being preferably interposed between the end of the handle and the fastening screw-nut $d^2$. The handle $h$ is provided with a longitudinal bore so as to be placed in position on the stem of the clamping screw $d$, and prevented from rotating on said stem either by making the end of the stem adjacent to the clamping screw $d$ of square cross-section and slightly tapering shape, or by securing to the end of the handle adjacent to the clamping screw $d$ a ferrule $e$ by means of a cross-pin $f$, as shown in Figs. 5 and 6. Adjacent to the square and flaring portion of the stem $d^1$ is arranged a collar $d^4$ against which the ferrule $e$ at the inner end of the handle $h$ abuts, and against which the handle is forced by the retaining screw-nut $d^2$.

When the handle is to be used on the right-hand side of the implement, the clamping screw is screwed through the threaded opening of the collar $b$ against the neck, stick or shank of the implement, so that the end of the clamping screw clamps the collar firmly against the same. When it is desired to use the handle on the opposite side of the neck, stick or shank of the implement, the clamping screw is loosened by turning the handle in reverse direction, so that the collar can be turned through an angle of 180° until it arrives at the other side of the neck, stick or shank at a point diametrically opposite to the position of the handle shown in the drawings. When the handle arrives in this position, it is turned on its axis and the clamping screw tightly fixed on the neck, stick or shank of the implement, so that the handle is then firmly supported at the other side of the same for use by the right hand, while the implement is held with the left hand.

The handle can be attached with great facility so as to extend to either side of the implement and permit the operation of the latter either by the right or left hand. The reversing of the handle is accomplished by simply unscrewing the clamping screw from the neck, stick or shank of the implement, then turning the handle with the collar to the opposite side of the same, and then reclamping the collar by turning the handle on its axis so that the clamping screw holds the collar firmly on the implement.

Having thus described my invention, I claim as new and desire to secure by Letters Patent:

1. A reversible handle for hand-operated implements consisting of a collar provided with a threaded hole, a clamping screw engaging in said hole and provided with a stem having a threaded outer end, a handle provided with a ferrule at its inner end and having a longitudinal bore receiving said shank, means carried at the inner end of the stem for holding the handle against inward movement on the stem and against rotation relative thereto, a nut on the threaded outer end of the stem for pressing the handle against said means, and a washer between said ferrule and said collar.

2. A reversible handle for hand-operated implements consisting of a collar provided with a threaded hole, a clamping screw engaging in said hole and provided with a squared shank tapering toward its outer end and having a threaded outer end, a handle having a squared tapering opening passing axially therethrough and conforming to the shape of and receiving said shank, a nut on the threaded outer end of said shank, a ferrule on the inner end of the handle, and a washer between said ferrule and collar.

In testimony, that I claim the foregoing as my invention, I have signed my name in presence of two subscribing witnesses.

WALTHER BEHM.

Witnesses:
PAUL GOEPEL,
FANNIE FISK.

Copies of this patent may be obtained for five cents each, by addressing the "Commissioner of Patents, Washington, D. C."